(12) United States Patent
Zhang et al.

(10) Patent No.: US 7,987,369 B2
(45) Date of Patent: Jul. 26, 2011

(54) USING WATERMARKING TO REDUCE COMMUNICATION OVERHEAD

(75) Inventors: Guodong Zhang, Farmingdale, NY (US); Prabhakar R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1207 days.

(21) Appl. No.: 11/114,286

(22) Filed: Apr. 26, 2005

(65) Prior Publication Data

US 2006/0200673 A1    Sep. 7, 2006

Related U.S. Application Data

(60) Provisional application No. 60/658,090, filed on Mar. 3, 2005.

(51) Int. Cl.
*H04L 9/32* (2006.01)
(52) U.S. Cl. .......... 713/176; 713/181; 726/30; 380/202; 380/270
(58) Field of Classification Search .................. 713/176, 713/181; 726/30; 380/202, 270
See application file for complete search history.

(56) References Cited

U.S. PATENT DOCUMENTS

| | | | |
|---|---|---|---|
| 5,778,304 A | 7/1998 | Grube et al. | |
| 5,960,081 A | 9/1999 | Vynne et al. | |
| 6,018,374 A | 1/2000 | Wrobleski | |
| 6,266,541 B1 | 7/2001 | Noda | |
| 6,343,213 B1 | 1/2002 | Steer et al. | |
| 6,353,778 B1 | 3/2002 | Brown | |
| 6,393,254 B1 | 5/2002 | Pousada | |
| 6,529,600 B1 | 3/2003 | Epstein et al. | |
| 6,559,883 B1 | 5/2003 | Fancher et al. | |
| 6,574,214 B1 * | 6/2003 | Khalil et al. | 370/349 |
| 6,591,096 B2 | 7/2003 | Ezuriko | |
| 6,625,455 B1 | 9/2003 | Ariga | |
| 6,662,023 B1 | 12/2003 | Helle | |
| 6,687,497 B1 | 2/2004 | Parvulescu et al. | |
| 6,738,572 B2 | 5/2004 | Hunter | |
| 6,771,635 B1 | 8/2004 | Vilander et al. | |
| 6,771,946 B1 | 8/2004 | Oyaski | |
| 6,868,229 B2 | 3/2005 | Balogh | |

(Continued)

FOREIGN PATENT DOCUMENTS

EP    0 505 266    3/1992

(Continued)

OTHER PUBLICATIONS

Mobasseri, "Exploring CDMA for Watermarking of Digital Video", Security and Watermarking of Multimedia Contents, Electronic Imaging'99, San Jose, Jan. 23-29, 1999.

(Continued)

*Primary Examiner* — Christian LaForgia
*Assistant Examiner* — Kari L Schmidt
(74) *Attorney, Agent, or Firm* — Volpe and Koenig, P.C.

(57) ABSTRACT

A method for reducing overhead when transmitting an Internet Protocol (IP) packet begins by selecting a watermarking signature based on the IP address of the packet. The watermarking signature is applied to the packet and the IP address is removed from the packet. The packet is sent to a receiver, which looks up the IP address of the packet by using the watermarking signature. The watermarking signature can be a radio frequency watermarking signature or a digital watermarking signature. A similar method employing watermarking can be used to reduce medium access control header overhead.

13 Claims, 6 Drawing Sheets

U.S. PATENT DOCUMENTS

| | | | |
|---|---|---|---|
| 7,260,722 B2* | 8/2007 | Forstrom et al. ............... | 713/176 |
| 2001/0027521 A1* | 10/2001 | Cromer et al. ................ | 713/191 |
| 2001/0031631 A1 | 10/2001 | Pitts | |
| 2002/0039896 A1 | 4/2002 | Brown | |
| 2002/0055361 A1 | 5/2002 | McDonnell et al. | |
| 2002/0058497 A1 | 5/2002 | Jeong | |
| 2002/0076084 A1 | 6/2002 | Tian et al. | |
| 2002/0107032 A1 | 8/2002 | Agness et al. | |
| 2002/0186845 A1 | 12/2002 | Dutta et al. | |
| 2003/0078076 A1 | 4/2003 | Kuwajima et al. | |
| 2003/0122671 A1 | 7/2003 | Jespersen | |
| 2003/0133573 A1 | 7/2003 | Himmel et al. | |
| 2003/0169342 A1 | 9/2003 | Steinberg et al. | |
| 2003/0200439 A1 | 10/2003 | Moskowitz | |
| 2003/0219231 A1 | 11/2003 | Vernon | |
| 2004/0029560 A1 | 2/2004 | Ariga | |
| 2004/0107347 A1 | 6/2004 | Ogino | |
| 2004/0110515 A1 | 6/2004 | Blumberg et al. | |
| 2004/0155969 A1 | 8/2004 | Hayashi | |
| 2004/0198306 A1 | 10/2004 | Singh et al. | |
| 2004/0204021 A1 | 10/2004 | Cocita | |
| 2005/0007456 A1 | 1/2005 | Lee et al. | |
| 2005/0008324 A1 | 1/2005 | Balogh | |
| 2005/0013462 A1* | 1/2005 | Rhoads ........................ | 382/100 |
| 2005/0039020 A1 | 2/2005 | Levy | |
| 2005/0043548 A1 | 2/2005 | Cates | |
| 2006/0156009 A1* | 7/2006 | Shin et al. ..................... | 713/176 |

FOREIGN PATENT DOCUMENTS

| | | |
|---|---|---|
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 326 422 | 7/2003 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 0 211 612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2002354228 | 12/2002 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 2004328434 | 11/2004 |
| JP | 200503379 | 2/2005 |
| WO | 98/34412 | 8/1998 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 4/2004 |
| WO | 2004/102313 | 11/2004 |

OTHER PUBLICATIONS

Sanzgiri et al., "A Secure Routing Protocol for Ad Hoc Networks", Proceedings of the 10$^{th}$ IEEE International Conference on Network Protocols (ICNP '02), IEEE, 2002, pp. 1-10.

Arslanagic, "Personal Firewall in Mobile Phone", Masters Thesis in Information and Communication Technology, Agder University College Faculty of Engineering and Science, Grimstad, Norway, May 2004.

IEEE, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 6 Medium Access Control (MAC) Security Enhancements," IEEE Std 802.11i-2004, Jul. 23, 2004.

* cited by examiner

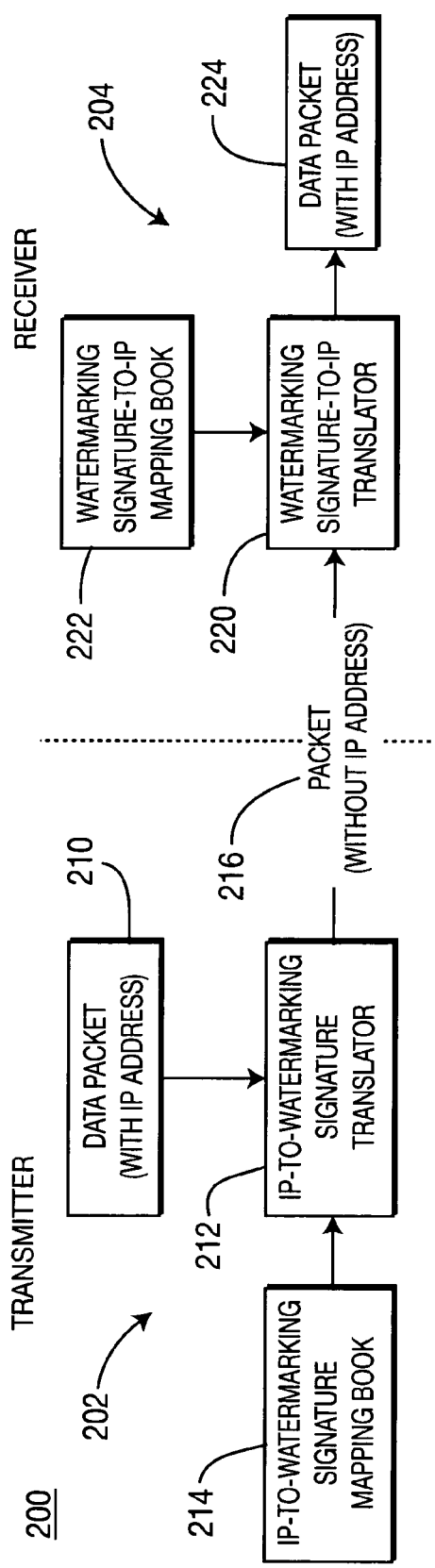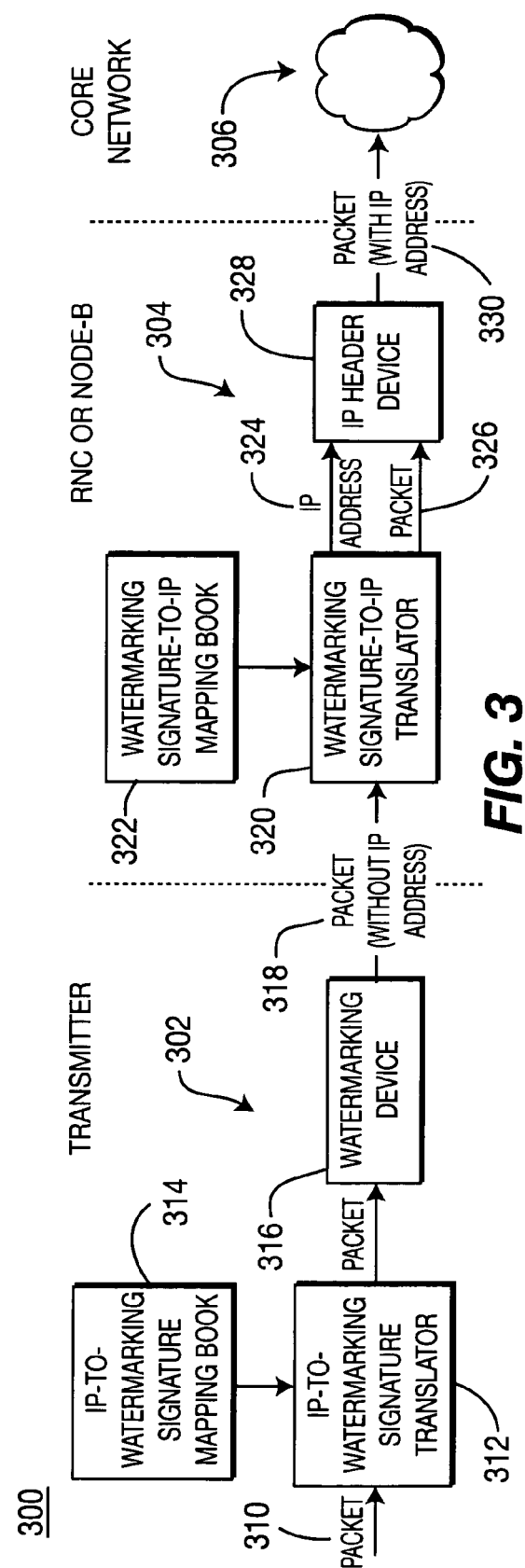

USING WATERMARKING TO REDUCE COMMUNICATION OVERHEAD

CROSS REFERENCE TO RELATED APPLICATIONS

This application claims the benefit of U.S. Provisional Application No. 60/658,090, filed Mar. 3, 2005, which is incorporated by reference as if fully set forth herein.

FIELD OF INVENTION

The present invention generally relates to using watermarking to reduce communication overhead, and more particularly to using watermarking to reduce the overhead of Internet Protocol (IP) communications and to using radio frequency (RF) watermarking to replace some medium access control (MAC) functions and signalings.

BACKGROUND

Wireless systems are susceptible in many respects. These susceptibilities are increasing as new wireless technologies are growing in prevalence. Ad-hoc networks, where individual users communicate with each other directly without using intermediary network nodes, create new susceptibilities to the users and the networks. These susceptibilities can be categorized as "trust", "rights", "identity", "privacy", and "security" related issues.

"Trust" refers to the assurance that information communicated in these systems can be shared. To illustrate, a wireless user may want to know that a communication was sent to it from a trusted source and using trusted communication nodes. The user in an ad-hoc network may have no knowledge that the communication was transferred over a hacker's wireless device with packet sniffing software. Additionally, with the use of tunneling, intermediate nodes transferring the communication may be transparent to the wireless user.

"Rights" ("rights management") refers to the control of data. To illustrate, one wireless user may have limited rights in a wireless system. However, if that user colludes (knowingly or unknowingly) with a second node having superior rights, that user may gain rights above those that the user is allowed.

"Identity" refers to the control linked to the identity of the wireless user. To illustrate, a rogue wireless device may attempt to access a wireless network by pretending to be an authorized user of the network, by using that authorized user's identity.

"Privacy" refers to maintaining privacy of the individual, data and context. A wireless user may not want others to know which web sites he/she visits and, in particular, any information sent to these sites, such as financial information, medical information, etc.

"Security" refers to the security of the data and context, such as preventing an unauthorized individual access to a wireless user's information.

To reduce the susceptibility of wireless networks, techniques such as wired equivalent privacy (WEP), Wi-Fi protected access (WPA), extensible authentication protocol (EAP), IEEE 802.11i, and global system for mobile communications (GSM) based encryption are used. Although these techniques provide some protection, they are still susceptible to the trusts, rights, identity, privacy, and security issues discussed above. To illustrate, although a particular wireless communication node may have the correct WEP keys to communicate with a wireless user, that user may not know whether he/she can "trust" that node.

Additionally, authentication of the user using these keys typically occurs at higher layers of the communication stack. Accordingly, even when these controls are in place, a rogue wireless user may have some (although limited) access to the communication stack. This access creates vulnerabilities, such as to denial of service attacks, among others.

Steganography is the art of passing information in a manner that the very existence of the message is unknown. The goal of steganography is to avoid drawing suspicion to the transmission of a hidden message. If suspicion is raised, then this goal is defeated. Steganography encompasses methods of transmitting secret messages through innocuous cover carriers in such a manner that the very existence of the embedded messages is undetectable. Creative methods have been devised in the hiding process to reduce the visible detection of the embedded messages.

Watermarking is a well-known technique for protecting and tracking digital information, which has been successfully exploited in the area of music and video data storage and communication. The traditional framework for watermarking consists of four elements: 1) a cover signal s, 2) a watermark w, 3) an embedding function E, and 4) a secret key k. The watermarked signal is then defined as $s_w = E_k\{s,w\}$. The watermark carrying signal $s_w$ must be robust to common signal processing operations, such as filtering, compression, etc., that are the basic functionalities of the network. Robustness is defined by the ability to extract the watermark from an altered signal. The second requirement of any watermarking scheme is imperceptibility; i.e., the difference between s and $s_w$ must not alter the operation of the system in any perceptible manner. The watermark must also be transparent in the sense that the watermark-unaware portions of the network must be able to process $s_w$ without additional hardware or software. The watermark must also be secure even though the watermarking algorithm itself may be public. This security is frequently achieved through a secret key that is exchanged with the receiver through some form of secure key exchange.

The concept of digital watermarking is used in information assurance and user authentication. A watermark is embedded into the user data, which is then transported by the physical layer of the communication link. The recipient extracts the watermark and compares it with a local copy to authenticate the transmitter.

Watermarks and signatures are techniques for adding metadata or unique information to media for signaling and/or security purposes. To reduce these susceptibilities to wireless communications, it is desirable to have alternate approaches to watermarking and adding signatures to wireless communications.

The widespread dissemination of audio, video, images, and text data on wireless communication networks raises intellectual property and security issues. Digital watermarking technology has been recognized as a solution to address these issues in the wireless communication networks. Watermarking is typically only used for security and copyright protection purposes. Its other potential usages have not been fully explored.

Internet Protocol (IP) V4 and IP V6 have been used for some applications in 3G (both universal mobile telecommunication system (UMTS) wideband code division multiple access (WCDMA) and Code Division Multiple Access (CDMA) 2000). It is also envisioned that the next generation wireless communication networks will be all IP-based, where the data will be transmitted using IP. However, the long IP header adds a large overhead for the data application even with a good IP header compression algorithm.

In addition, some medium access control (MAC) functions and signaling can be replaced by using RF watermarking. In this way, the signaling load, overhead, and complexity in the system can be reduced.

SUMMARY

The present invention exploits the application of watermarking in communication systems, leading to more efficient communications that are IP-based. In particular, the overhead of the IP header can be reduced by appropriately using watermarking.

A method for reducing overhead when transmitting an Internet Protocol (IP) packet begins by selecting a watermarking signature based on the IP address of the packet. The watermarking signature is applied to the packet and the IP address is removed from the packet. The packet is sent to a receiver, which looks up the IP address of the packet by using the watermarking signature. The watermarking signature can be a radio frequency watermarking signature or a digital watermarking signature.

A system for reducing overhead when transmitting an Internet Protocol (IP) packet includes a transmitter and a receiver. The transmitter includes an IP address to watermarking signature mapping book and an IP address to watermarking signature translator. The IP to watermarking signature translator examines the IP address of a packet, looks up the IP address in the IP to watermarking signature mapping book, removes the IP address from the packet, and applies the watermarking signature corresponding to the IP address to the packet. The packet is then transmitted to the receiver. The receiver includes a watermarking signature to IP address mapping book and a watermarking signature to IP address translator. The watermarking signature to IP translator examines the watermarking signature of a received packet, looks up the watermarking signature in the watermarking signature to IP mapping book to retrieve the IP address of the received packet, and adds the IP address to the received packet. The received packet is then forwarded to its destination.

A method for using radio frequency (RF) watermarking to reduce medium access control (MAC) layer signaling in a wireless communication system begins by assigning a unique RF watermarking signature to each user. The RF watermarking signature is sent to a receiver during connection signaling. The RF watermarking signature is applied to subsequent transmissions to the receiver. The RF watermarking signature is examined at the receiver, whereby the watermarking signature is used to identify the user.

A system for using radio frequency (RF) watermarking to reduce medium access control (MAC) layer signaling in a wireless communication system includes a transmitter, a receiver, and a network. The network includes a RF watermarking signature assignment device, which assigns a unique RF watermarking signature to the transmitter, including a user identifier. The transmitter includes a storage for storing the assigned RF watermarking signature, a connection signaling device for sending the assigned RF watermarking signature to the receiver, and a RF watermarking signature application device for applying the assigned RF watermarking signature to data to be transmitted. The receiver includes a RF watermarking signature extractor for removing the assigned RF watermarking signature from a received packet and decoding the assigned RF watermarking signature to determine the user identifier, whereby the user identifier in the MAC header can be replaced by the assigned watermarking signature.

BRIEF DESCRIPTION OF THE DRAWINGS

A more detailed understanding of the invention may be had from the following description of a preferred embodiment, given by way of example, and to be understood in conjunction with the accompanying drawings, wherein:

FIG. 2 is a diagram of a system implementing the method shown in FIG. 1;

FIG. 3 is a diagram of an implementation of the system shown in FIG. 2 in a UMTS WCDMA system;

DETAILED DESCRIPTION OF THE PREFERRED EMBODIMENTS

Hereafter, the term "station" (STA) includes, but is not limited to, a wireless transmit/receive unit, a user equipment, a fixed or mobile subscriber unit, a pager, or any other type of device capable of operating in a wireless environment. When referred to hereafter, the term "access point" (AP) includes, but is not limited to, a base station, a Node B, a site controller, or any other type of interfacing device in a wireless environment.

Reducing IP Header Overhead

Figure 1:
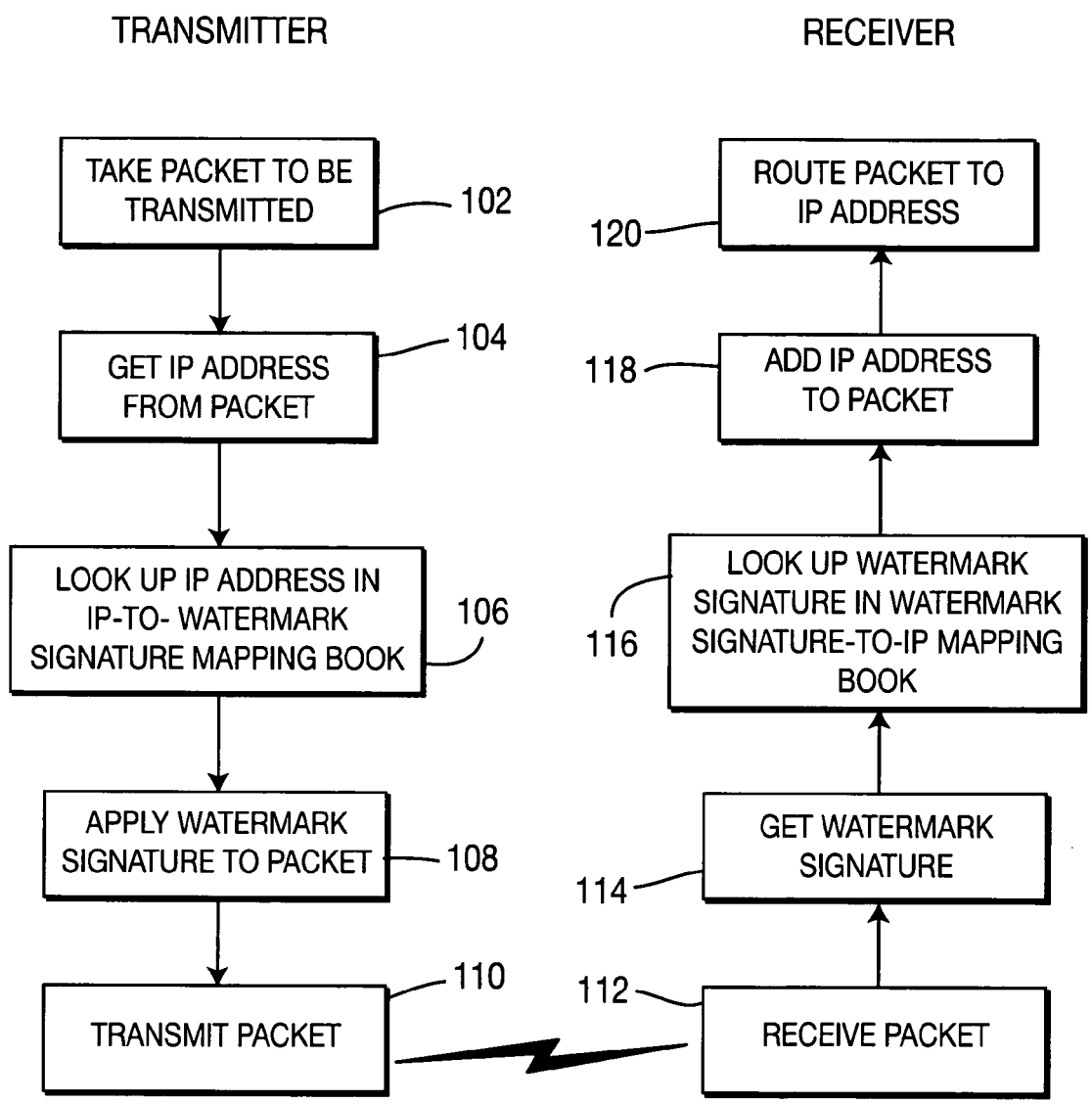
FIG. 1 is a flowchart of a method for using watermarking to reduce the overhead of an IP header.

A method 100 for using watermarking to reduce the overhead of an IP header transmission over a wireless interface is shown in FIG. 1. The method 100 begins in a transmitter by taking a packet to be transmitted (step 102). The IP address is obtained from the packet (step 104) and is looked up in an IP address to watermark signature mapping book (step 106). The watermark signature mapped to the IP address is applied to the packet (step 108) and the packet is transmitted without an explicit IP address field (step 110).

At a receiver, the method 100 continues by receiving the packet (step 112). The watermark signature is taken from the packet (step 114) and is looked up in a watermark signature to IP address mapping book (step 116). The IP address is added to the packet (step 118) and the packet is routed to the IP address (step 120).

FIG. 2 shows a system 200 for implementing the method 100, and includes a transmitter 202 and a receiver 204. The transmitter 202 takes a data packet 210 that has an IP address and inputs the packet 210 into an IP address to watermarking signature translator 212. The translator 212 looks up the IP address of the packet 210 in an IP address to watermarking signature mapping book 214. The mapping book 214 contains a list that correlates an IP address to a particular watermarking signature. In a preferred embodiment, the mapping book 214 is stored in a database. The mapping of the IP address can, in some implementations, be quite trivial. For example, the IP address may be embedded exactly as it is, bit by bit. In an alternate embodiment, the watermark may code the entire IP header (which contains additional data), and not just the IP address.

The translator 212 removes the IP address from the packet 210 and applies the watermarking signature from the mapping book 214, creating a packet 216 which does not contain an IP address but instead contains the watermarking signature. The packet 216 is then sent to the receiver 204.

At the receiver 204, a watermarking signature to IP address translator 220 receives the packet 216. The translator 220 removes the watermarking signature from the packet 216 and looks up the watermarking signature in a watermarking signature to IP address mapping book 222. Similar to the mapping book 214, the mapping book 222 contains a list that correlates a watermarking signature to a particular IP address. The translator 220 adds the IP address to the packet 216 to create a data packet 224, which contains the IP address.

EXAMPLE

An example system 300, implemented in the uplink of a UMTS WCDMA system and using RF watermarking, is shown in FIG. 3. However, the invention applies to both the uplink and the downlink of wireless communication networks that use IP for some data applications (such as 3G) or use IP for all data applications (an all IP-based system). The present invention can also be used with wired communication systems using IP.

The system 300 includes a transmitter 302, a radio network controller (RNC) or Node B 304, and a core network 306. The transmitter 302 sends data packets 310 in the uplink for an IP-based application. The transmitter 302 inputs a packet 310 into an IP address to watermarking signature translator 312. The translator 312 looks up the IP address of the packet 310 in an IP address to watermarking signature mapping book 314. The mapping book 314 contains a pre-agreed list of IP addresses and their corresponding watermarking signatures. A watermarking device 316 takes the packet 310 and adds the watermarking signature corresponding to the IP address of the packet to create a packet 318 that does not have an IP address.

The packet 318 is sent from the transmitter 302 to either the RNC or the Node B 304 that controls the transmitter 302. The remainder of this discussion will refer to a RNC; however, the present invention operates in the same manner if a Node B were used. The packet 318 is received at the RNC 304 and is passed to a watermarking signature to IP address translator 320. The translator 320 looks up the watermarking signature of the packet 318 in a watermarking signature to IP address mapping book 322. The mapping book 322 contains a list of pre-agreed watermarking signatures and their corresponding IP addresses and contains the same information as the mapping book 314.

The translator 320 removes the watermarking signature from the packet 318, and passes an IP address 324 and a packet 326 to an IP header device 328. The IP header device 328 places the IP address 324 into a header and combines it with the packet 326 to create a packet 330 that contains an IP address. The packet 330 is then sent to the core network 306 and is routed to the appropriate IP address. The data packet will be routed to its destination according to its IP address (the same as current systems). In this way, the IP header overhead over the wireless interface is saved without degrading IP services.

By using the system 300, the RNC 304 can determine the IP address of a received data packet by mapping the received watermarking signature (in the packet 318) to the IP address according to the watermarking signature to IP address mapping book 322. In this way, an IP header does not have to be transmitted over the wireless interface from the transmitter 302 to the RNC 304.

Replacing Fields in the MAC Header

RF watermarking can also be used to replace some fields (such as user identification (ID), logical channel ID, etc.) in the medium access control (MAC) header in an IP packet. This can be done in wireless communication networks that use a shared channel and/or a dedicated channel. In networks that use a shared channel, the user ID is usually contained in the MAC header in order to allow the receiver to identify the associated user. In networks that use a shared channel or a dedicated channel, the logical channel ID is usually contained in the MAC header in order to allow the receiver to perform logical channel de-multiplexing for the user.

Replacing the User ID Field

Figure 4:
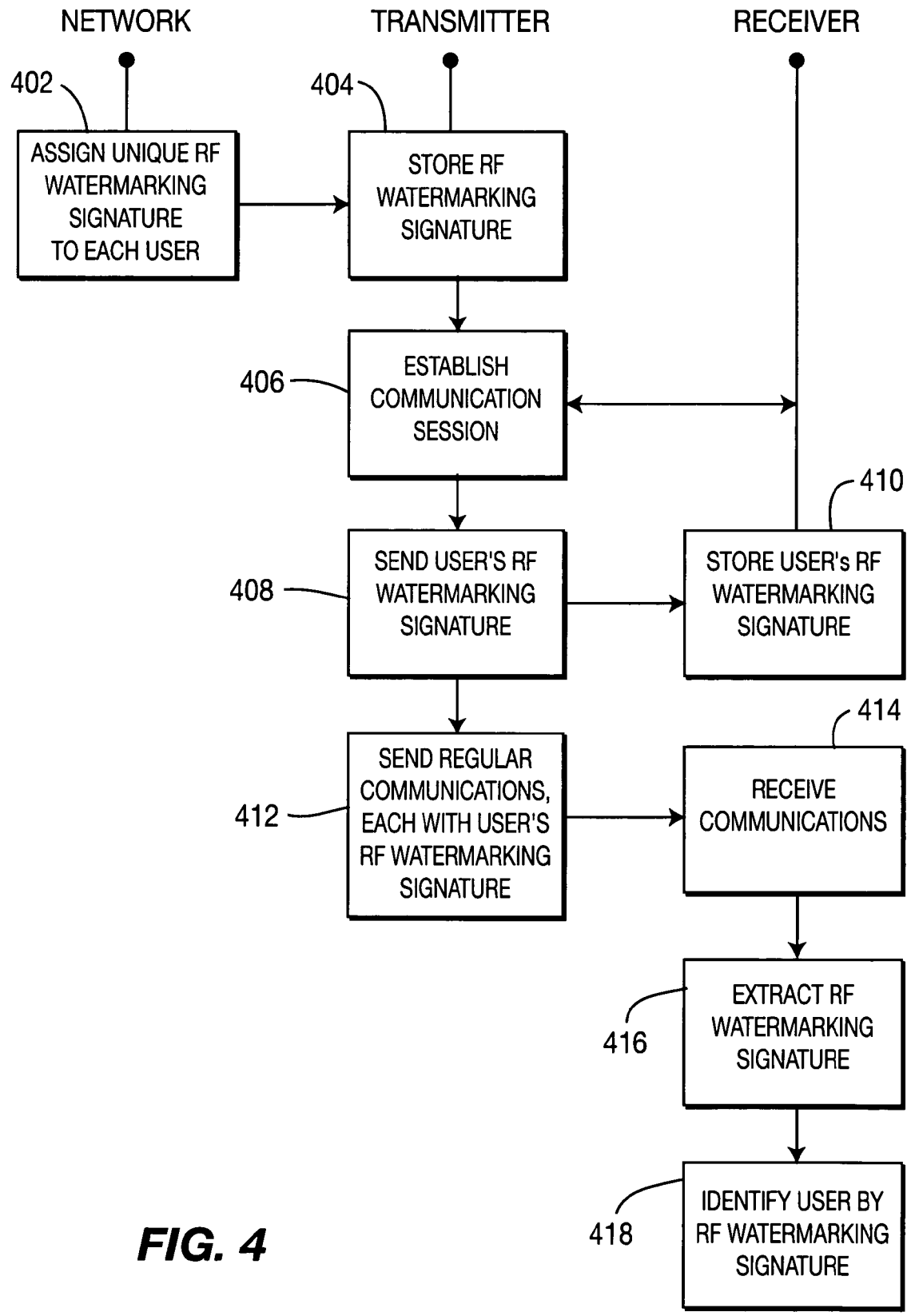
FIG. 4 is a flowchart of a method for using radio frequency (RF) watermarking to replace a user identification field in a medium access control (MAC) header in an IP packet.

A method 400 for using RF watermarking to replace the user ID field in the MAC header is shown in FIG. 4. The method 400 begins with a network assigning a unique RF watermarking signature to each user (step 402). The assigned RF watermarking signature is stored at the user's transmitter (step 404). The transmitter establishes a communication session with a receiver (step 406). The transmitter sends the user's RF watermarking signature to the receiver during establishment of the communication session, as part of the connection signaling information (step 408). The receiver stores the user's RF watermarking signature for later use (step 410).

The transmitter sends regular communications to the receiver, and each communication contains the user's RF watermarking signature (step 412). The receiver receives the communications from the transmitter (step 414) and extracts the RF watermarking signature (step 416). The receiver uses the RF watermarking signature to identify the user (step 418). By using the RF watermarking, the user ID field can be eliminated from the MAC header and the receiver can still identify the associated user. The receiver knows which user the received signal belongs to by checking the RF watermarking signature. Therefore, there is no need for the transmitter to send a data packet with an explicit user ID field in the MAC header.

Figure 5:
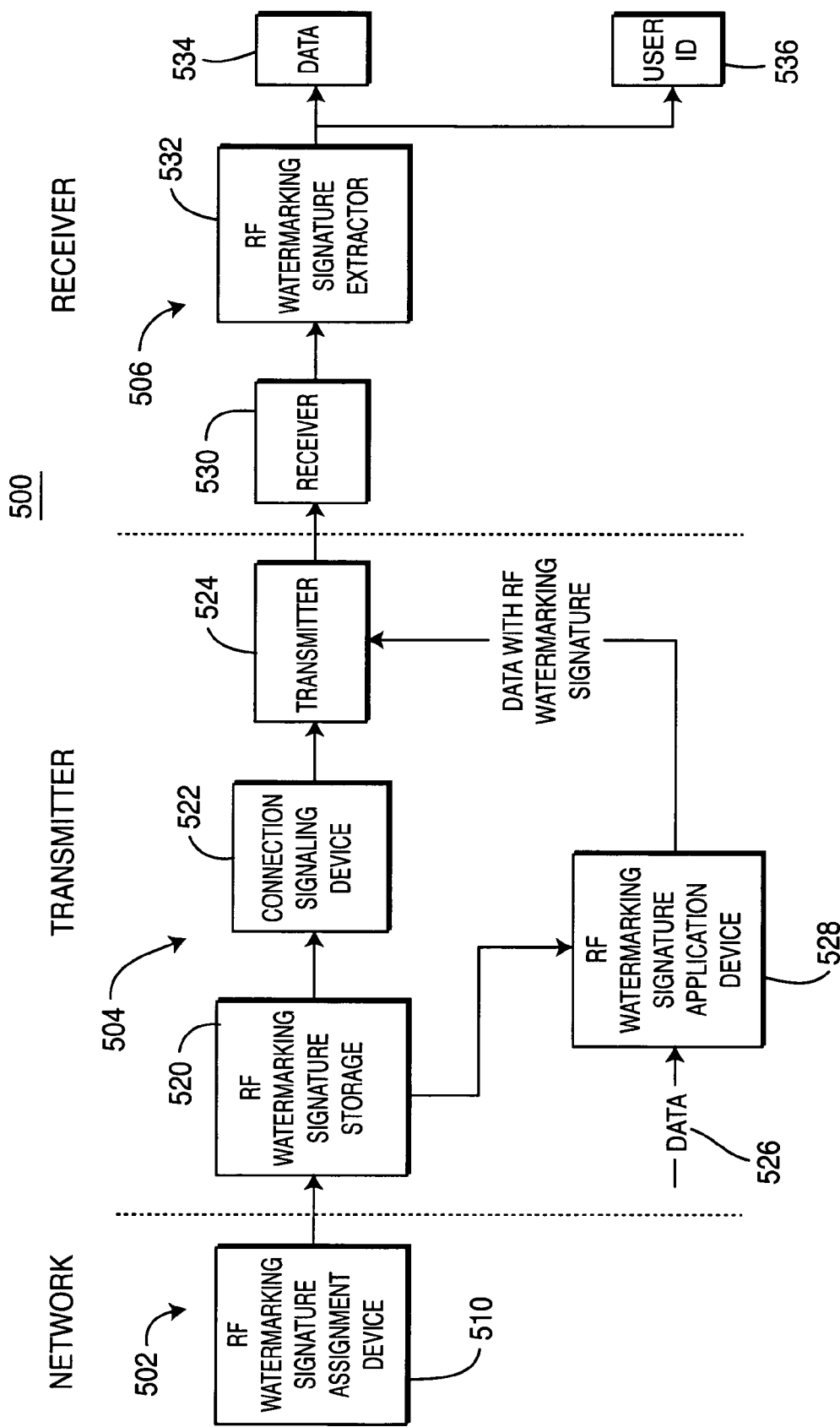
FIG. 5 is a diagram of a system implementing the method shown in FIG. 4.

FIG. 5 shows a system 500 for implementing the method 400. The system 500 includes a network 502, a transmitter 504, and a receiver 506. The network 502 includes a RF watermarking signature assignment device 510, which assigns a RF watermarking signature to each user.

The transmitter 504 includes a RF watermarking signature storage 520 which receives and stores the RF watermarking signature from the assignment device 510. A connection signaling device 522 accesses the signature storage 520 to retrieve the RF watermarking signature assigned to the user. The connection signaling device 522 sends the RF watermarking signature to the receiver 506 via a transmitter 524. Data 526 is provided to a RF watermarking signature application device 528 which applies the watermarking signature to the data, which is then forwarded to the transmitter 524 for transmission to the receiver 506.

The receiver 506 includes a receiver 530, which receives communications from the transmitter 504. Received communications are passed to a RF watermarking signature extractor 532, which removes the watermarking signature from the received communications. The RF watermarking signature extractor 532 outputs data 534 and the user ID 536 associated with the transmitter 504.

Replacing the Logical Channel ID Field

Figure 6:
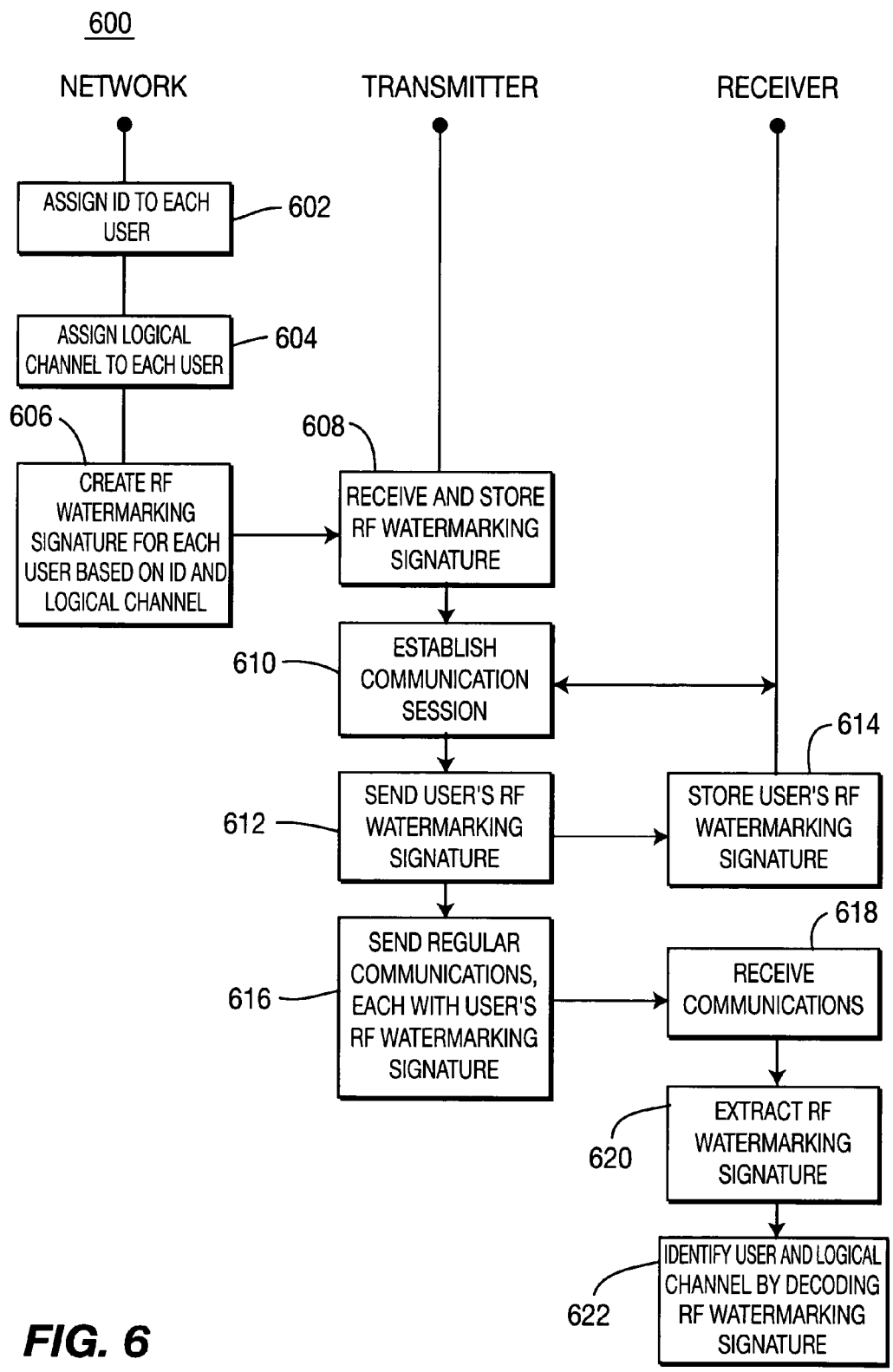
FIG. 6 is a flowchart of a method for using RF watermarking to replace a logical channel identification field in a MAC header in an IP packet.

By using RF watermarking, the logical channel ID field can be eliminated from the MAC header and the receiver can still identify the associated logical channel and perform functions such as de-multiplexing. A method 600 for replacing the logical channel ID field in the MAC header with a RF watermarking signature is shown in FIG. 6. The method 600 begins with a network assigning an ID to each user (step 602) and assigning a logical channel to each user (step 604). The RF watermarking signature is created for each user by combining the assigned ID and the assigned logical channel (step 606). The watermarking signature of a user consists of two parts: the first part is unique for each user (the user ID), and the second part maps to an index 1, 2, . . . , N, where N is the number of logical channels.

The network sends the properly assigned RF watermarking signature to the transmitter, which receives and stores watermarking signature (step 608). The transmitter establishes a communication session with a receiver (step 610) and sends the watermarking signature as part of the connection signaling information (step 612). The receiver stores the user's watermarking signature for later use (step 614).

The transmitter sends regular communications to the receiver, and each communication contains the user's RF watermarking signature (step 616). The receiver receives the communications from the transmitter (step 618) and extracts the watermarking signature (step 620). The receiver decodes the watermarking signature to identify the user and the logical channel used (step 622).

The receiver can learn which user the received signal belongs to by checking the first part of the received RF watermarking signature. The receiver also can identify the associated logical channel by checking the second part of the watermarking signature. Therefore, there is no need for the transmitter to send a data packet with explicit user ID and logical channel fields in the MAC header.

It is noted that the logical channel ID field is described as an exemplary case. The same approach can be applied for other fields in the MAC header that are used to distinguish data that belongs to the same user, such as priority class, queue ID, etc.

Figure 7:
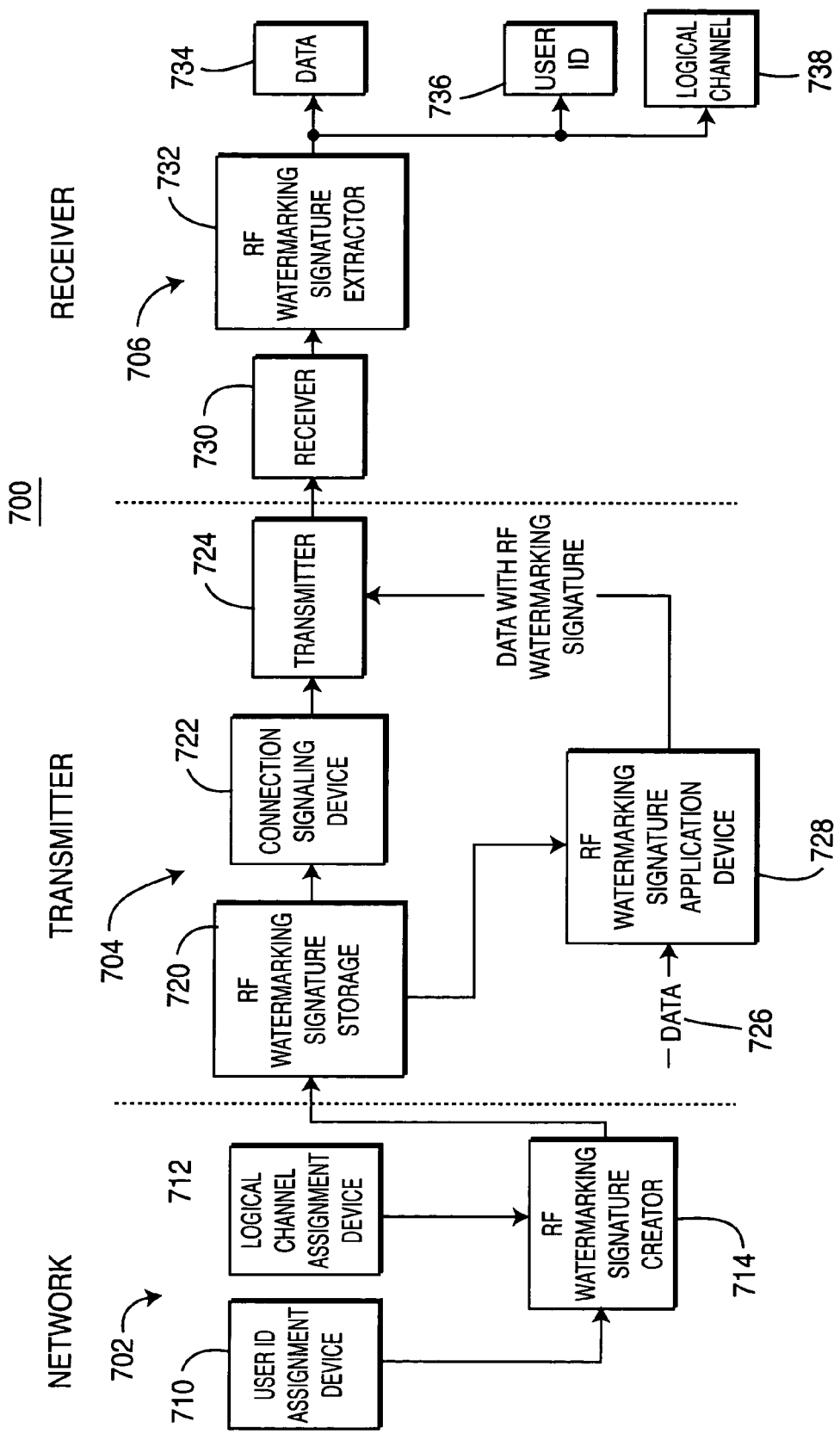
FIG. 7 is a diagram of a system implementing the method shown in FIG. 6.

FIG. 7 shows a system 700 for implementing the method 600. The system 700 includes a network 702, a transmitter 704, and a receiver 706. The network 702 includes a user ID assignment device 710, which assigns an ID to each user. A logical channel assignment device 712 assigns a logical channel to each user. A RF watermarking signature creator 714 receives the user ID and the logical channel assignment and creates a RF watermarking signature for the user, which is then sent to the transmitter 704.

The transmitter 704 includes a RF watermarking signature storage 720 which receives and stores the watermarking signature from the signature creator 714. A connection signaling device 722 accesses the signature storage 720 to retrieve the watermarking signature assigned to the user. The connection signaling device 722 sends the watermarking signature to the receiver 706 via a transmitter 724. Data 726 is provided to a RF watermarking signature application device 728 which applies the watermarking signature to the data, which is then forwarded to the transmitter 724 for transmission to the receiver 706.

The receiver 706 includes a receiver 730, which receives communications from the transmitter 704. Received communications are passed to a RF watermarking signature extractor 732, which removes the watermarking signature from the received communications. The signature extractor 732 outputs data 734, the user ID 736, and the logical channel 738 associated with the transmitter 704.

The components of the receiver, transmitter, or network can be implemented using an integrated circuit (IC), such as an application specific integrated circuit (ASIC), logical programmable gate array (LPGA), multiple ICs, LPGAs, discrete components, or a combination of IC(s), LPGA(s), and/or discrete component(s).

The principles of the present invention are equally applicable to any type of wireless communication system. In addition, the principles of the present invention can be applied to wired communication systems by using digital watermarks, instead of RF watermarks. Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for reducing overhead when transmitting an Internet Protocol (IP) packet, comprising:
    selecting a watermarking signature based on the IP address of the packet using a translator;
    removing the IP address from the packet and applying the watermarking signature to the packet, wherein the packet is without an IP address; and
    transmitting the packet to a receiver.

2. The method according to claim 1, wherein the watermarking signature is a radio frequency watermarking signature.

3. The method according to claim 1, wherein the watermarking signature is a digital watermarking signature.

4. A transmitter configured to reduce overhead when transmitting an Internet Protocol (IP) packet, comprising:
    an IP address to watermarking signature mapping book; and
    an IP address to watermarking signature translator configured to examine the IP address of a packet, look up the IP address in the IP to watermarking signature mapping book, remove the IP address from the packet, and apply a watermarking signature corresponding to the IP address to the packet prior to transmitting the packet.

5. The transmitter according to claim 4, wherein the watermarking signature is a radio frequency watermarking signature.

6. The transmitter according to claim 4, wherein the watermarking signature is a digital watermarking signature.

7. A radio frequency (RF) watermarking transmitter, comprising:
    a storage, configured to store a medium access control (MAC) header which does not have a user identification field and to store an assigned RF watermarking signature that replaces the user identification field, the signature being unique to the transmitter and including a user identifier;
    a connection signaling device, configured to send the assigned RF watermarking signature and the MAC header to a receiver; and
    a RF watermarking signature application device configured to apply the assigned RF watermarking signature to, and remove the user identification field from, data to be transmitted.

8. The transmitter according to claim 7, wherein the storage, connection signaling device, and RF watermarking signature application device are further configured to handle an RF watermarking signature created from a user identifier and a logical channel assignment.

9. A receiver configured to reduce overhead in wireless communications using Internet Protocol (IP) packets, comprising:

a watermarking signature to IP address mapping book; and a watermarking signature to IP address translator configured to examine a watermarking signature of a received packet, look up the watermarking signature in the watermarking signature to IP mapping book to retrieve an IP address of the received packet, and add the IP address to the received packet prior to forwarding the received packet.

10. The receiver according to claim 9, wherein the watermarking signature is a radio frequency watermarking signature.

11. The receiver according to claim 9, wherein the watermarking signature is a digital watermarking signature.

12. A receiver configured to use radio frequency (RF) watermarking to reduce medium access control (MAC) layer signaling in wireless communications, comprising:

a RF watermarking signature extractor, configured to remove an assigned RF watermarking signature from a received packet, decode the assigned RF watermarking signature to determine a user identifier and insert the determined user identifier in a MAC header, whereby the user identifier was replaced by the assigned watermarking signature.

13. The receiver according to claim 12, wherein the RF watermarking signature extractor is further configured to decode the assigned RF watermarking signature to determine an assigned logical channel.

* * * * *